Feb. 25, 1936. H. A. THRUSH Re. 19,873

HOT WATER HEATING SYSTEM

Original Filed Jan. 26, 1933 3 Sheets-Sheet 1

Inventor
Homer A. Thrush

By

Attorney

Feb. 25, 1936. H. A. THRUSH Re. 19,873

HOT WATER HEATING SYSTEM

Original Filed Jan. 26, 1933 3 Sheets-Sheet 2

Inventor
Homer A. Thrush.

By

Attorney

Feb. 25, 1936. H. A. THRUSH Re. 19,873

HOT WATER HEATING SYSTEM

Original Filed Jan. 26, 1933 3 Sheets-Sheet 3

Inventor,
Homer A. Thrush

By

Attorney

Reissued Feb. 25, 1936 Re. 19,873

UNITED STATES PATENT OFFICE 19,873

HOT WATER HEATING SYSTEM

Homer A. Thrush, Peru, Ind., assignor to H. A. Thrush & Co., Peru, Ind., a corporation of Indiana Original No. 1,931,419, dated October 17, 1933, Serial No. 653,723, January 26, 1933. Application for reissue October 12, 1935, Serial No. 45,309

11 Claims. (Cl. 237—63)

This invention relates to hot water heating systems and particularly to heating systems in which water for domestic use is heated in connection with or independent of the heating of the house or office.

The object of the invention is to provide a heating system having automatic controls for cutting off circulation through the main heating system when the temperature of the room reaches proper degree and at the same time using the heating system to more rapidly heat the water for domestic use.

A further object is to provide a system of controls for fuel to the main heating system in response to the demands both upon the heating system and the hot water supply.

Figure 1:
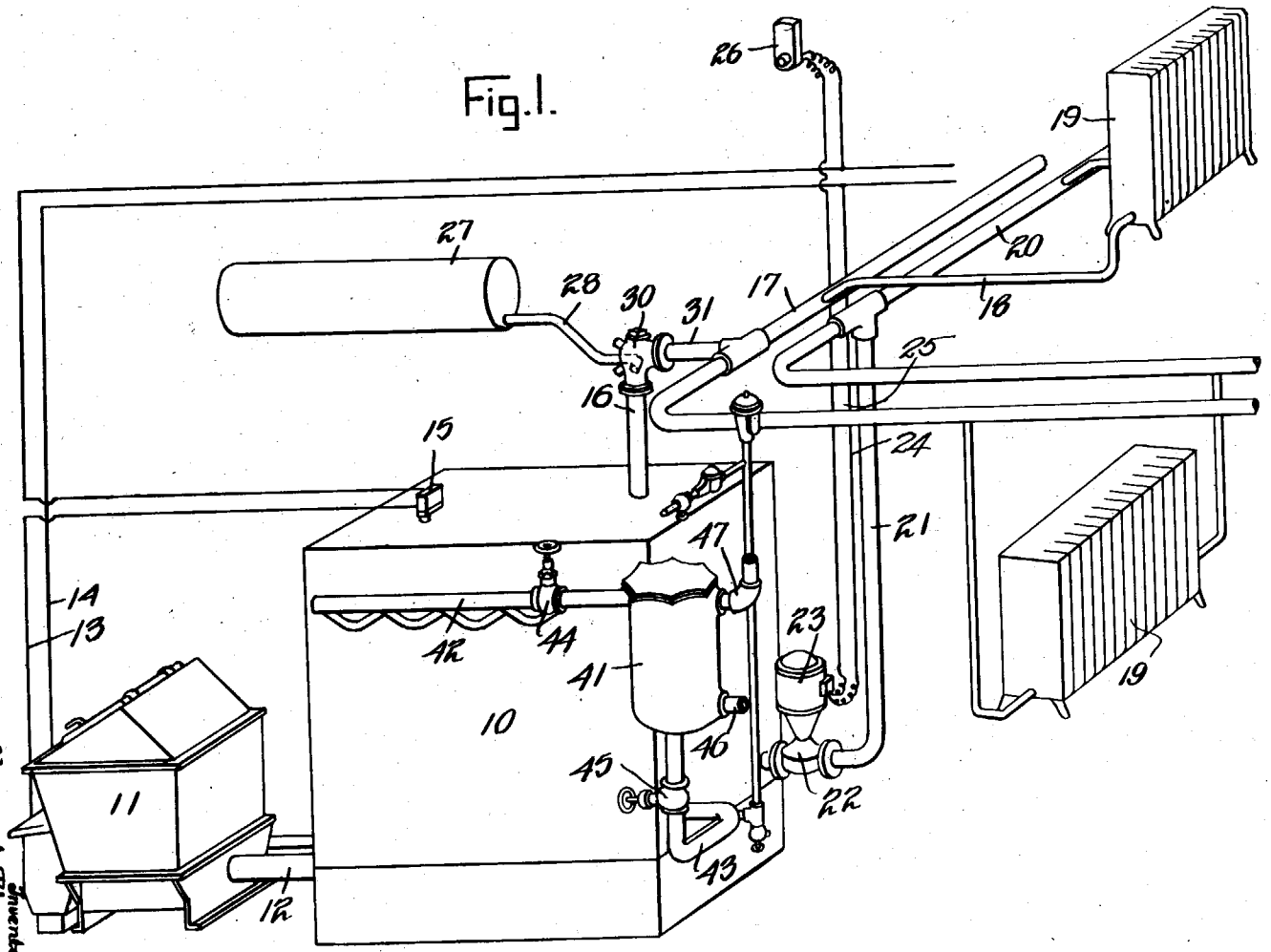
Figure 2:
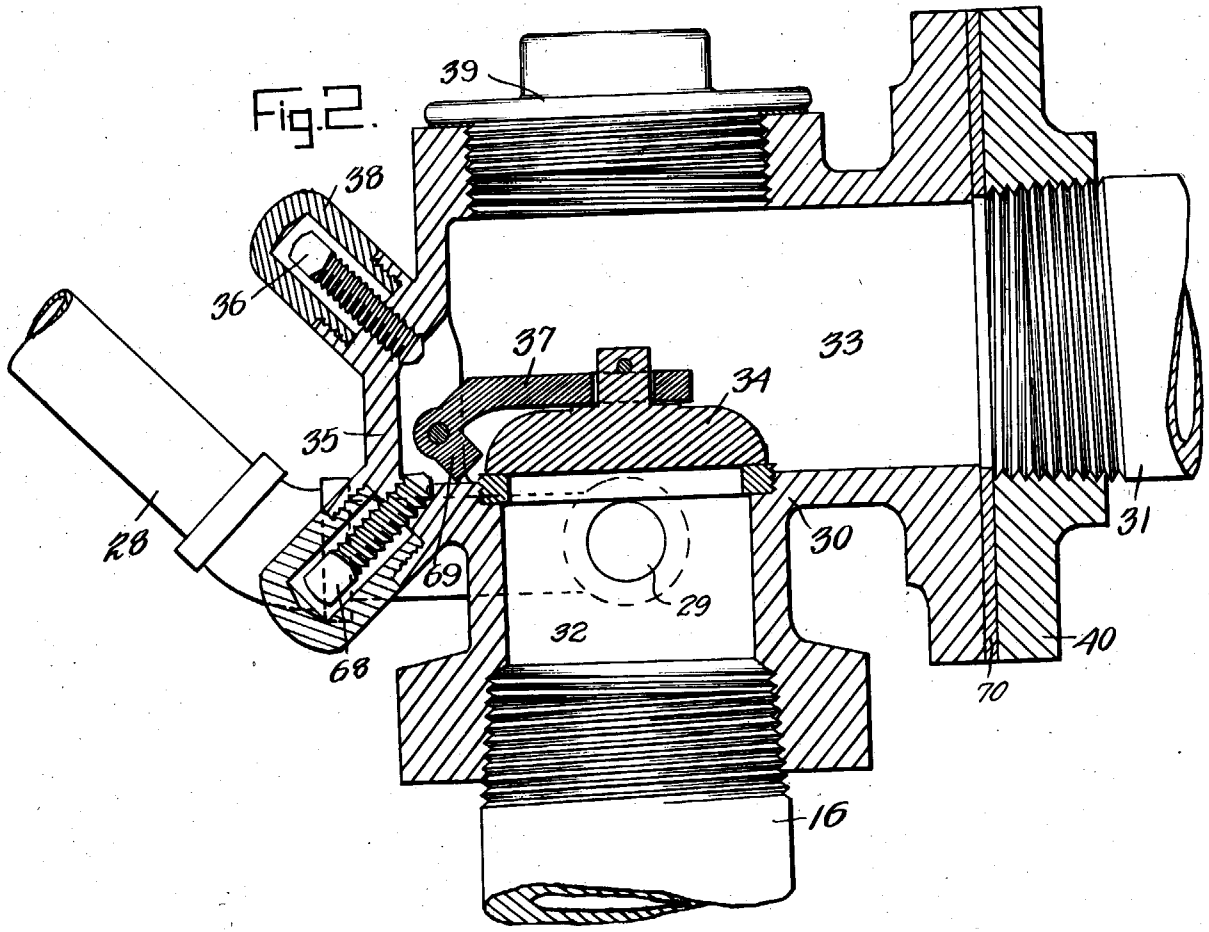
Figure 3:
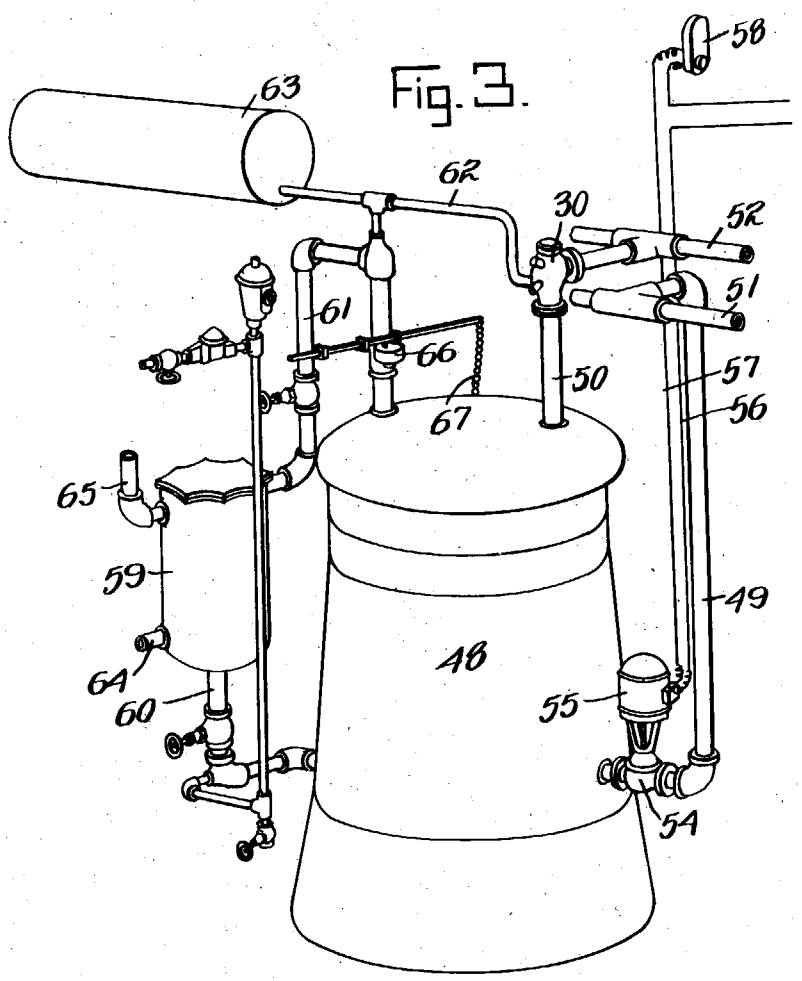

Further objects and advantages will become apparent from the description which follows:

Referring to the accompanying drawings, which are made a part hereof and on which similar reference characters indicate similar parts, Figure 1 is a side elevation of a heating system having automatic furnace fuel feed and having my invention incorporated therein, Figure 2, a sectional view of a valve forming a part of the system, Figure 3, a side elevation of a hand feed furnace for a heating system having my invention incorporated therein.

In the drawings numeral 10 indicates a hot water boiler of any suitable and conventional construction. In the form shown the boiler is heated by an automatic stoker by means of which fuel is fed to the furnace from a hopper 11 through a feed tube 12. A motor for operating the fuel feed is operated by current supplied through lines 13 and 14, this circuit to the motor being controlled by a thermostatic switch 15 which is operated in response to changes of temperature of the water within the boiler 10. Hot water is supplied from the boiler 10 through a pipe 16, pipe 31, a manifold 17 and through lateral pipes 18 which enter radiators 19. Water is returned from the radiators by manifold 20 and pipe 21 entering the lower portion of the boiler. Forced circulation of water through the radiators is effected by means of a pump 22, operated by motor 23, current being supplied to the motor through lines 24 and 25. Circuit to the motor is controlled by a thermostatic switch 26 located in the rooms being heated. A vent pressure tank 27 is connected by means of pipe 28 to a port 29 in valve casing 30. Steam or air which might tend to accumulate in chamber 32 of the valve will pass through pipe 28 to the tank 27 where the steam will condense. This prevents gaseous pressure beneath the closure plate 34 and prevents passage of warm gas from passing into the radiators. The valve 30 is placed between the pipe 16 and the pipe 31. The valve 30 is divided into inlet and outlet chambers 32 and 33 by means of a weighted valve 34. This valve is hinged at 35 to the side of the valve casing. A plug 36 is screw threaded through a side of the casing and may be adjusted to engage the hinged portion 37 of the valve to hold the valve on its seat. A cap 38 is screwed upon a portion of the valve casing enclosing the screw 36. A similar plug 68 is threaded through the valve casing and may be screwed in to engage a lug 69 on the hinged portion 37 to hold the valve open. An opening in the valve casing is closed by a removable plug. The pipe 31 is preferably threaded into a cap 40 which is secured in any suitable manner to a flange on the casing 30, suitable packing material 70 being provided to prevent leakage of fluid between the cap and the flange. A tank 41 is connected by pipes 42 and 43 with the upper and lower portions of the hot water boiler 10, circulation of water from the boiler 10 through the tank 41 being controlled by valves 44 and 45. The tank 41 is connected by pipes 46 and 47 with a hot water storage tank.

In operation when the heating system for the house is in operation hot water from the boiler 10 is circulated through pipes 16 and 17 to the radiators 19 and returned through pipes 20 and 21 to the boiler 10. This circulation is produced by means of the pump 22. This pump will be in operation so long as the temperature in the room is below a predetermined degree. When the temperature rises sufficiently to open thermostat switch 26, circuit to the motor 23 is broken and the pump 22 is stopped. When this occurs the weight of the valve 34 will close communication between the chambers 32 and 33 and prevent gravity circulation of the fluid through the system. The purpose of the pump 22 is to give sufficient pressure head to the water to force the circulation of the liquid through the system against the weight of valve 34. So long as water is being circulated through the radiators the temperature of the water in the boiler 10 will be kept at a fairly low degree since the water is giving up its heat to the radiators which in turn give it up to the rooms which are being heated. As soon as the pump 22 is stopped and circulation of water through the radiators is stopped the loss of heat from the water is reduced so that water in the tank 41 is heated much faster. As long as the temperature of the water within the boiler 10 is below a predetermined degree the switch 15 will remain closed so that the fuel feed to the boiler continues. When the water in the boiler 10 rises above a predetermined temperature, thermostat switch 15 is opened so that circuit through the lines 13 and 14 is interrupted so that the automatic stoker is stopped.

From the foregoing description it will be apparent that the system will be automatically operated to maintain a predetermined temperature within the rooms to be heated and that water for domestic use will be maintained at the desired temperature and that there will always be an ample supply of hot water. The system moreover prevents any lost energy in that the water in the hot water tank as well as that in the radiators will never go beyond a predetermined desired temperature. The system therefore will operate without losses due to overheating either of the domestic water supply or of the radiators forming a part of the heating system.

In the summer it will be desirable to prevent any circulation of water through the radiators. The screw 36 may be turned down to engage the latch 37 so as to hold the valve 34 upon its seat. This will prevent any circulation of water through the radiators. The boiler 10 may then operate to heat the auxiliary hot water tank 41. The fuel feed will be operated in response to temperature changes as before so that there will be no lost energy or surplus heating since the temperature of the water in the boiler 10 will be controlled and kept within predetermined limits. The plug 68 may be screwed in to lift the valve and hold it open. When in this position water may circulate freely by gravity without assistance from pump 22.

In the modified form shown in Figure 3 a hand fed furnace is shown. In this form 48 is the boiler and furnace having a water return pipe 49 from the radiators and a supply line 50 to the radiators, these pipes being connected to manifolds 51 and 52 respectively, which lead to radiators, the radiators not being shown. The valve 30, shown in Fig. 2, is placed between the outlet pipe 50 and the manifold 52. A pump 54 operated by electric motor 55 circulates water to and from the radiators. The motor 55 is operated by current supplied through lines 56 and 57, circuit being closed by means of a thermostat switch 58. The hot water heating tank is shown at 59. The water in this tank is heated by hot water which is circulated through the tank from the boiler 48, circulation taking place through pipes 60 and 61 which are connected respectively to the lower portion of the boiler 48 and preferably to the top of this boiler. The pipes 61 and 50 communicate through a pipe 62 with the tank 63. The water to be heated is supplied to and drawn from the indirect heating tank 59 through pipes 64 and 65, respectively. A thermostat 66 operates a damper through a chain 67.

In operation water to the radiators is circulated by means of the pump 54. This builds up a pressure head having a sufficient force to deliver water through the valve 53 into the supply manifold 52 to the radiators. When the pump 54 is stopped gravity circulation of the heating fluid also stops. This causes the temperature of the water in boiler 48 to rise so that the water is circulated more rapidly through the tank 59 to heat the water in this tank more rapidly. Operation of the pump 54 is controlled by power lines 56 and 57. When the temperature of the room in which the radiators are placed rises above a predetermined degree, the switch 58 is opened so as to stop operation of the motor and pump 55 and 54. Thermostat 66 provides means for closing the draft to the boiler 48, so as to make this type of heater also partially automatic in operation. In any case circulation of the hot water through the radiators is controlled automatically so as to prevent the radiators from being heated to too high a temperature and cutting off circulation of fluid to the radiators automatically acts to increase heating of the water by the indirect heating system in the tank 59.

While I have shown the invention as applied to a hand fired furnace and a stoker in which coal is used as fuel, the invention is in no sense limited to the use of hard fuel. The invention is equally applicable to furnaces in which oil or gas is used as fuel.

It will be obvious to those skilled in the art that various changes may be made in my device without departing from the spirit of the invention and therefore I do not limit myself to what is shown in the drawings and described in the specification, but only as indicated by the appended claims.

By reference to the vent being anterior to the valve is meant that the vent is ahead of the valve in the direction of flow from the boiler in the circulating system.

Having thus fully described my said invention, what I claim as new and desire to secure by Letters Patent, is:

1. In a hot water heating system the combination with a radiator of a boiler having a supply line and a return line to and from the radiator, means for forcibly circulating water through said lines, a check valve in the supply line loaded to resist circulation of the water but permitting forced circulation thereof, an air tank and a connection on the inlet side of said valve to said tank for permitting gas to vent to the said tank when said valve is closed thereby preventing circulation of warm fluid through the valve into the radiator.

2. In a hot water heating system the combination with a radiator of a boiler having a supply line and a return line to and from the radiator, means for forcibly circulating water through said lines, a check valve in the supply line loaded to resist circulation of the water but permitting forced circulation thereof, an air tank and a connection on the inlet side of said valve to said tank for permitting gas to vent to the said tank when said valve is closed thereby preventing circulation of warm fluid through the valve into the radiator, and means for holding said valve closed to prevent circulation of water to the radiator.

3. In a hot water heating system the combination with a radiator of a boiler having a supply line and a return line to and from the radiator, means for forcibly circulating water through said lines, a check valve in the supply line loaded to resist circulation of the water but permitting forced circulation thereof, an air tank and a connection on the inlet side of said valve to said tank for permitting gas to vent to the said tank when said valve is closed thereby preventing circulation of warm fluid through the valve into the radiator, and means for holding said valve open to permit unrestricted circulation of water to the radiator.

4. In a hot water heating system having a boiler, a plurality of radiators, a fluid supply line from said boiler to said radiators and a return line from the radiators to the boiler, means for forcibly circulating fluid through said lines, a valve in said supply line divided into an inlet and an outlet chamber, a loaded valve controlling passage of fluid from the inlet to the outlet chamber, a port in said valve communicating with the inlet chamber, an air presure tank and a pipe connecting said port with said air pressure tank.

5. In a hot water heating system, a boiler, a plurality of radiators, fluid conduits from said boiler to said radiators and from the radiators back to the boiler, a pump for forcing circulation from the radiators through the boiler and back to the radiators, a valve in the supply line to the radiators having a plurality of ports, one connected to the boiler, another connected to the radiator, a partition in the valve casing between said ports, a valve seat in said partition, a weighted valve movable toward and from said seat, a third port in the valve casing on the inlet side of the valve and adjacent said partition, an air pressure tank, a pipe connecting said air pressure tank with the said third port to permit air and other gases to pass from the inlet side of said valve to the said tank to prevent their passing into the radiators.

6. In a hot water heating system the combination with a radiator of a boiler having a supply line and a return line to and from the radiator, means for forcibly circulating water through said lines, a valve in the supply line loaded to resist circulation of the water but permitting forced circulation thereof, said valve having a vent on its inlet side for permitting gas to escape when said valve is closed thereby preventing circulation of warm fluid through the valve into the radiator.

7. In a hot water heating system the combination with a radiator of a boiler having a supply line and a return line to and from the radiator, means for forcibly circulating water through said lines, a valve in the supply line loaded to resist circulation of the water but permitting forced circulation thereof, said valve having a vent on its inlet side for permitting gas to escape when said valve is closed thereby preventing circulation of warm fluid through the valve into the radiator, and means for holding said valve closed to prevent circulation of water to the radiator.

8. In a hot water heating system the combination with a radiator of a boiler having a supply line and a return line to and from the radiator, means for forcibly circulating water through said lines, a valve in the supply line loaded to resist circulation of the water but permitting forced circulation thereof, said valve having a vent on its inlet side for permitting gas to escape when said valve is closed thereby preventing circulation of warm fluid through the valve into the radiator, and means for holding said valve open to permit unrestricted circulation of water to the radiator.

9. In a hot water heating system, the combination with a radiator, of a boiler having a supply line and a return line to and from the radiator, means for forcibly circulating the water through said supply and return lines, a valve in said supply line loaded to build up pressure on its inlet side and prevent thermal circulation in the system but permitting forced circulation therethrough, and venting means in said supply line anterior to the valve.

10. In a hot water heating system, a boiler wherein water is heated, means for maintaining the water in the boiler constantly hot, a radiator, supply and return lines connecting the boiler and radiator to form a hot water circulating system, a pump for intermittently producing forced circulation of the heated water in the circulating system, a shut off valve in the supply line loaded to prevent thermal circulation of the water but permitting forced circulation thereof, and means communicating with the supply line anterior to said valve for accommodating gases liberated in the boiler to prevent such gases from opening said valve and circulating to said radiator when the pump is inactive.

11. A hot water heating system including in combination a boiler, a radiator, a first pipe from the upper portion of the boiler extending upwardly to the radiator, a second pipe extending from the radiator downwardly to the boiler, a shut off valve in the first pipe loaded to prevent thermal circulation of the water but permitting forced circulation thereof, a pump for intermittently producing forced circulation in said system, and means for preventing the gases liberated in the boiler and passing upwardly into the first pipe from entering the first pipe on the remote side of the valve from the boiler and passing to the radiator when said pump is inactive.

HOMER A. THRUSH.